United States Patent

Najmolhoda et al.

[11] Patent Number: 6,019,120
[45] Date of Patent: *Feb. 1, 2000

[54] SINGLE STAGE VARIABLE FORCE SOLENOID PRESSURE REGULATING VALVE

[75] Inventors: Hamid Najmolhoda, Grand Rapids; David L. Seid, North Muskegon; David A. Nezwek, Marne, all of Mich.

[73] Assignee: Saturn Electronics & Engineering, Inc., Auburn Hills, Mich.

[*] Notice: This patent is subject to a terminal disclaimer.

[21] Appl. No.: 09/158,690

[22] Filed: Sep. 22, 1998

Related U.S. Application Data

[63] Continuation-in-part of application No. 08/770,635, Dec. 19, 1996, Pat. No. 5,845,667.

[51] Int. Cl.[7] ............ F15B 13/044; G05D 16/20
[52] U.S. Cl. ............ 137/82; 137/625.61; 251/129.14
[58] Field of Search ............ 137/82, 625.61; 251/129.14

[56] References Cited

U.S. PATENT DOCUMENTS

| | | | |
|---|---|---|---|
| 4,077,431 | 3/1978 | Martin et al. | |
| 4,774,976 | 10/1988 | Janecke | 137/14 |
| 4,988,074 | 1/1991 | Najmolhoda | 251/129.08 |
| 5,051,631 | 9/1991 | Anderson | 310/14 |
| 5,060,695 | 10/1991 | McCabe | |
| 5,075,584 | 12/1991 | Hendrixon et al. | 310/14 |
| 5,186,093 | 2/1993 | Kervagoret | 91/433 |
| 5,234,030 | 8/1993 | Kervagoret et al. | |
| 5,240,227 | 8/1993 | Sich | |
| 5,240,277 | 8/1993 | Scheulderman | 280/241 |
| 5,253,676 | 10/1993 | Craig | |
| 5,414,398 | 5/1995 | Schumacher | 335/255 |
| 5,513,832 | 5/1996 | Becker et al. | 137/82 X |
| 5,611,370 | 3/1997 | Najmolhoda | 137/625.61 |
| 5,845,667 | 12/1998 | Najmolhoda et al. | 137/82 X |

FOREIGN PATENT DOCUMENTS 8529255  1/1987  Germany.

*Primary Examiner*—Gerald A. Michalsky

[57] ABSTRACT

A solenoid actuated valve for regulating the pressure of a pressurized fluid in a fluid control system in proportion to the current level of an electrical input signal including a nozzle housing having an end connected to a solenoid housing and a fixed fluid flow directing tubular sleeve internal thereof and communicated to a supply port for receiving pressurized fluid therefrom. The sleeve includes a primary orifice communicating to a valve seat proximate the end of the nozzle housing and to a control port located proximate a second end of the nozzle housing via one or more longitudinal fluid passages between the nozzle housing and the sleeve. The sleeve includes a secondary bleed orifice located proximate the control port to bleed pressurized fluid thereto in a manner to provide more precise low pressure fluid control. A variable force solenoid actuated valve cooperates with the valve seat and receives pressurized fluid from the primary orifice to control flow of pressurized fluid to one or more exhaust ports as a means to regulate pressure at the control port in dependence upon electrical current to a coil of the solenoid actuated valve. The nozzle housing, fluid directing sleeve and valve seat are molded or cast as a one-piece component.

14 Claims, 5 Drawing Sheets

SINGLE STAGE VARIABLE FORCE SOLENOID PRESSURE REGULATING VALVE

This application is a continuation-in-part of Ser. No. 08/770,635 filed Dec. 19, 1996, now U.S. Pat. No. 5,845,667.

FIELD OF THE INVENTION

The present invention relates to a proportional variable force solenoid operated valve that controls fluid pressure in response to electrical current applied to a valve solenoid and, more particularly, to a pressure regulating proportional variable force solenoid having multiple ports to provide more precise low pressure control over wide operating fluid pressures and temperatures.

BACKGROUND OF THE INVENTION

A proportional variable force solenoid control valve that is relative low in cost to manufacture and compact in size while maintaining substantially linear proportional fluid control is described in the Najmolhoda U.S. Pat. No. 4,988,074 issued Jan. 29, 1991, of common assignee herewith. The patented proportional variable force solenoid control valve comprises an outer steel solenoid housing and an aluminum valve member nozzle joined together mechanically such as by tabs on the steel solenoid housing being crimped about regions of the aluminum valve member nozzle.

The proportional variable force control valve includes a ferromagnetic (e.g. steel) armature suspended by low spring rate springs at opposite ends of the armature within the bore hole of a coreless solenoid bobbin for reciprocable movement between positions corresponding to a closed valve position and fully open valve position in response to applied electrical current to an electromagnetic coil. The position of the armature is controlled by balancing the variable force of an electromagnetic field of an electromagnetic coil and the force of the magnetic field of a permanent ring magnet against the force of a compression coil spring which biases the valve toward the closed position of the valve. The electromagnetic coil, bobbin and armature reside in the steel solenoid housing. The fluid control valve on the end of the armature moves relative to a valve seat disposed in the aluminum valve nozzle to communicate a fluid inlet to fluid exhaust ports so as to regulate fluid pressure at fluid control ports in a manner proportional to the magnitude of applied electrical current.

A commercially manufactured version of the aforementioned patented proportional variable force solenoid fluid control valve has been modified to include a stainless steel ball valve and a separate stainless steel valve seat insert pressed in the nozzle. The ball valve is captured in a stainless steel cage between the valve seat and a rod-like, cylindrical shaped steel armature that moves relative to the valve seat in a manner proportional to the magnitude of electrical current applied to the electromagnetic coil. As the armature moves relative to the valve seat to actuate the valve, the ball valve is caused to follow the end of the armature by virtue of fluid pressure in the valve member housing and confinement in the ball valve cage in the nozzle. The fluid inlet is communicated to fluid exhaust ports by opening of the ball valve so as to regulate fluid pressure at fluid control ports in a manner proportional to the magnitude of electrical current applied to the coil.

A spool valve is disposed in the valve member housing for providing a two stage, high flow capability wherein pressurized fluid supplied to the inlet port initially is directed to bypass the control ports and flows to an end of the spool valve to move it from a zero fluid flow spool position to a maximum fluid flow spool position relative to the control ports as determined by the cracking pressure preset for the ball valve by adjustment of the coil spring force. Thereafter, a second stage of operation involves controlling the fluid flow through the control ports by moving the spool valve between minimum and maximum flow spool positions in a manner proportional to the magnitude of electrical current to the coil. Such proportional variable force solenoid control valves commercially manufactured to-date are operably mounted to a cast aluminum transmission body or case by a clamp plate, bolt, or both engaging an outer nozzle groove.

An object of the present invention is to provide a variable force solenoid fluid pressure regulating valve having improved low pressure control (e.g. at or near zero gage pressure) over wide operating pressures and temperatures by virtue of a control bleed orifice located proximate the control port.

Another object of the present invention is to provide a variable force solenoid fluid pressure regulating valve having a simplified construction by virtue of a nozzle housing, a fixed fluid flow directing internal sleeve, and optionally a valve seat being molded, cast or otherwise formed as a one-piece component for connection to a solenoid housing.

SUMMARY OF THE INVENTION

The present invention provides in one embodiment a pressure regulating variable force solenoid fluid control valve for regulating the pressure of a pressurized fluid in a fluid control system in proportion to the current level of an electrical input signal. In one embodiment of the present invention, the pressure regulating variable force solenoid fluid valve comprises a nozzle housing having an end connected to a solenoid housing and having a supply port for receiving pressurized fluid and supplying the pressurized fluid to a fixed internal fluid flow directing tubular sleeve. The internal sleeve includes a primary orifice that communicates to a valve seat proximate the end of the nozzle housing and to a control port via one or more fluid passages between the nozzle housing and the sleeve. The internal sleeve also includes a secondary bleed orifice located proximate the control port to bleed pressurized fluid directly to the control port in a manner to provide more precise low pressure fluid control, for example, particularly as control port gage pressure approaches zero gage (control) pressure, over wide range of fluid pressures and temperatures. The control port communicates with an external fluid actuated component, such as a hydraulic automobile transmission component, to control operation thereof. A variable force solenoid actuated valve cooperates with the valve seat to control flow of pressurized fluid to one or more exhaust ports as a means to regulate pressure at the control port in dependence upon electrical current to a coil of the solenoid actuated valve.

In one embodiment of the invention, the nozzle housing includes a second open end remote from the end joined to the solenoid housing and defining one or more control ports. The one or more control ports are communicated to the primary orifice via the fluid passages between the nozzle housing and the internal sleeve.

The present invention provides in another embodiment a pressure regulating variable force solenoid fluid control valve for regulating the pressure of a pressurized fluid in a fluid control system in proportion to the current level of an electrical input signal wherein the nozzle housing and the internal fluid flow directing sleeve as well as optional valve seat are molded, cast or otherwise formed as a one-piece component to simplify construction of the valve. The one-piece component comprising the nozzle housing, fixed internal fluid-flow directing sleeve, and optionally the valve seat is connected to the solenoid housing, particularly to a non-magnetically permeable solenoid housing.

The foregoing and other objects, features, and advantages of the invention will become apparent from the following more detailed description taken with the accompanying following drawings.

DESCRIPTION OF THE INVENTION

Figure 1:
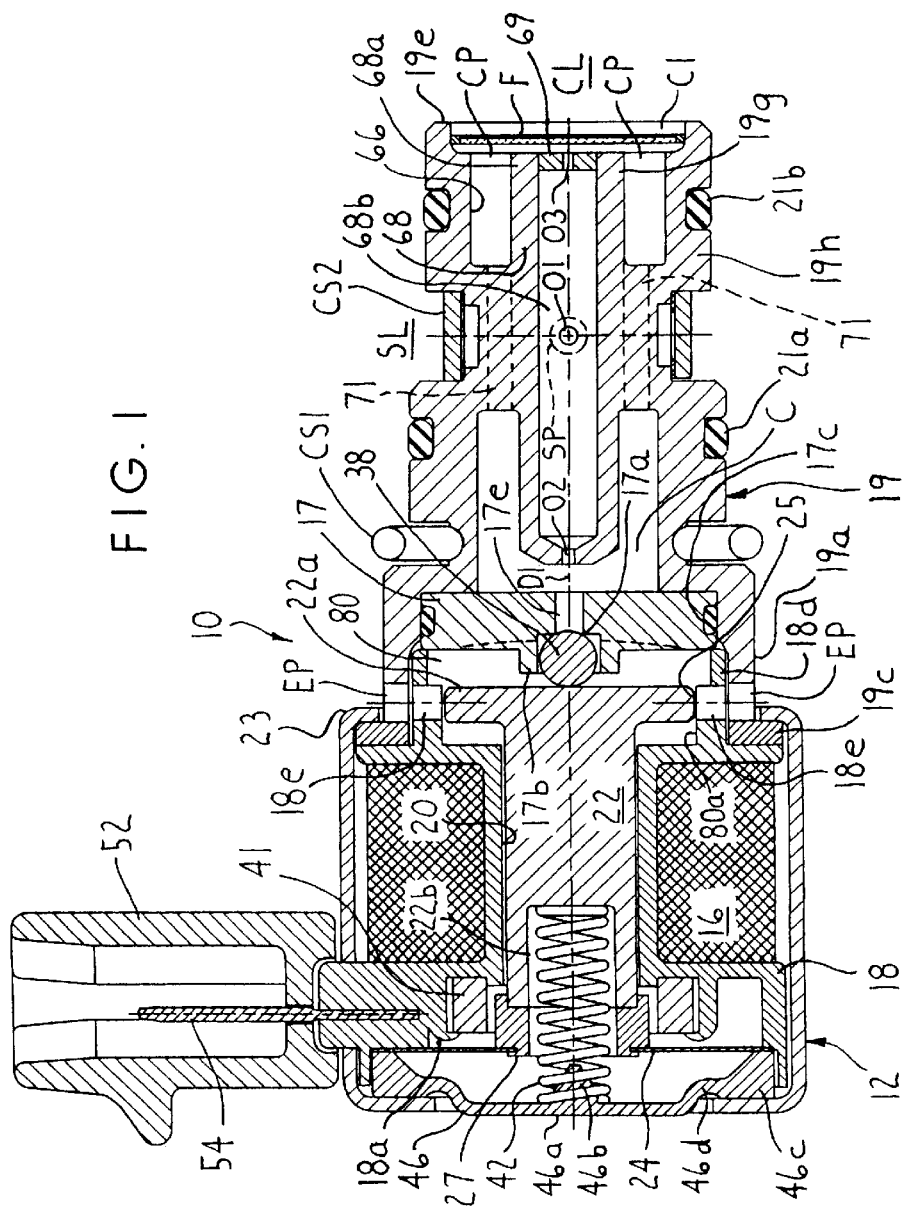
FIG. 1 is a longitudinal cross section view of a single stage pressure regulating proportional variable force solenoid fluid valve in accordance with an embodiment of the invention.
Figure 2:
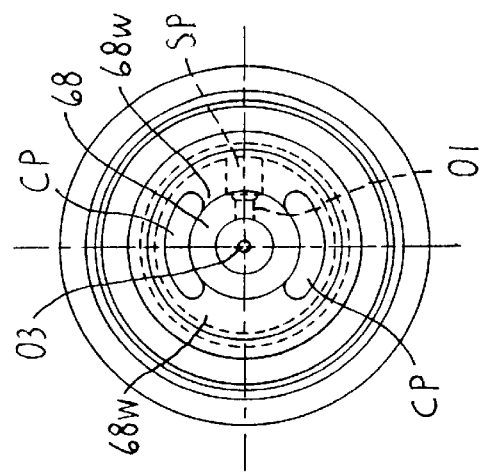
FIG. 2 is an end elevation of the valve of FIG. 1.

Referring to FIGS. 1–2, a proportional variable force solenoid fluid control valve 10 includes a solenoid can or housing 12 and a nozzle housing 19 having a first end 19a connected to the solenoid housing 12. The solenoid housing 12 encloses solenoid components for actuating a valve mechanism in a manner to be described below. The solenoid housing 12 preferably comprises a substantially nonmagnetic material having little or no magnetic permeability, for example, as compared to the magnetic permeability of a ferromagnetic material, such as steel. A material particularly suited for the solenoid housing 12 comprises aluminum and its alloys or thermoplastic formed by casting or injection molding to required configuration to receive the solenoid actuated valve components to be described.

The solenoid actuated fluid control valve 10 includes a solenoid 14 comprising an electromagnetic coil 16 wound about a molded plastic bobbin 18 which has a cylindrically shaped bore hole 20 through the longitudinal axis thereof. The bobbin 18 is made of glass filled thermoplastic. A rod-like steel armature 22 is suspended within the bore hole 20 of the plastic bobbin 18 by a thin low spring rate spring 24 and by an innermost armature end 22a.

The plate springs 24 is of the type described in U.S. Pat. No. 4,988,074, the teachings of which are incorporated herein by reference. That is, the spring plate is formed from very thin nonmagnetic austenitic stainless steel, such as full hard austenitic stainless steel, which provides a very low rate spring for the spring configuration shown in FIG. 5 of the aforementioned '074 patent. The outer periphery of the plate spring 24 is mounted between an end surface of the bobbin 18 and an end cap or closure 46. The inner periphery of the plate spring 24 is mounted in a groove of a collar 27 affixed to the armature 22 by press fit and made of brass. By use of the spring plate 24, the armature 22 is suspended for free axial longitudinal movement within the bobbin 18.

The armature 22 comprises a flat outermost axial end having a counterbore 22b that receives a coil compression spring 42 for biasing the armature 22 to the right in FIG. 1. The coil compression spring 42 (spring biasing means) is trapped between the axial armature end and a central hub 46a of the valve housing cap or closure 46. The central hub 46a includes an inwardly, axially extending cylindrical spring locating projection or stud 46b that is received in the coil spring 42 with the end of the spring 42 engaging the inner surface or wall of the central hub 46a as shown in FIG. 1. The armature 22 is biased to a valve closed position by the coil spring 42 when the solenoid electromagnetic coil 16 is deenergized.

The valve housing cap or closure 46 is deformable in a manner to adjust the force exerted by the coil spring 42 on the armature 22 and thus the valve fluid pressure response to electrical current level supplied to the solenoid 14 (i.e. fluid pressure versus solenoid current). In particular, the force exerted by the coil spring 42 on the armature 22 is adjusted using an adjustment tool to provide a desired bleed rate of fluid past ball valve 38 or cracking pressure of the ball valve 38 in a manner described in copending patent application Ser. No. 08/586,056 of common assignee herewith to provide a desired fluid pressure versus solenoid current response. The housing closure 46 includes a peripheral region 46c. The peripheral region 46c is engaged by an end shoulder region of the solenoid can or housing 12 crimped over the region 46c such that the central hub 46a engages the spring 42. The closure 46 comprises machined aluminum alloy.

The closure 46 is deformable in a central hub 46a opposing the spring 42. A recessed or grooved region 46d is disposed concentrically about the central hub 46a between the hub 46a and the peripheral lip 46c. The annular recessed or grooved region 46d has a relatively smaller cross-section, FIG. 1, as compared to the peripheral region 46b. The central hub 46a typically suffers the primary or majority of permanent deformation by engagement with the adjustment tool to permit axial adjusting movement of the hub 46a relative to the peripheral region 46b, although the grooved region 46d also may undergo some deformation to this same end. The grooved region 46d helps to confine the majority of deformation to the central hub 46a. The central hub 46a is permanently adjusted in axial position after the closure 46 is secured to the valve housing 19 to adjust the valve response.

An axially magnetized permanent ring magnet 41 is held in position relative to the coil 16 by a bobbin retainer flange 18a. The ring magnet 41 thereby is disposed at the rear end of the bobbin 18 axially rearward of the coil 16. Ring magnet 41 is formed of rare earth permanent magnet material, such as a $Nd_2Fe_{14}B$ permanent magnet, permitting use of a reduced size magnet that results in a compact solenoid and enhanced stability, such as reduced loss of magnetism at elevated temperatures. The ring magnet 41 produces a permanent magnetic field that substantially saturates the armature 22 even in the absence of electrical current to the coil 16. A relatively small electromagnetic field is required to move the armature 22 between axial positions corresponding to valve "on" and "off" states where the "on" state provides a zero supply gage pressure at control ports CP and the "off" state provides full pressurized fluid at control ports CP.

The proportional variable force solenoid control valve described using a ring magnet in combination with a electromagnetic coil is described in U.S. Pat. Nos. 4,988,074 and 5,611,370, the teachings of which are incorporated herein by reference.

A plastic connector body 52 shown in FIG. 1 is mounted on the bobbin 18 and exits the solenoid can or housing 12 at a side thereof. The connector body 52 includes electrical contacts 54 (one shown) that are used to provide electrical current to the coil 16. The electrical contacts 54 extend through the bobbin 18 and through apertures in the connector body 52. Such electrical contacts 54 are shown in the aforementioned U.S. Pat. No. 4,988,074. The ends of the electrical contacts 54 are connected to the wires of the electromagnetic coil 16 for receiving an electrical current signal from a variable current source (not shown).

As shown in FIG. 1, the innermost armature end 22a of the armature 22 engages an elastomeric or metal ball valve 38 that cooperates with a valve seat 17a formed on the valve seat insert 17 residing in the nozzle housing 19. The ball valve 38 and valve seat 17a define a fluid diverting or exhausting valve for diverting or exhausting fluid to one or more exhaust ports EP in a manner described herebelow that can be communicated to a fluid sump or return (not shown).

The innermost armature end 22a comprises a damping member or disc having a cylindrical outer periphery or surface 25 that cooperates with cylindrical damping chamber 80 defined by a cylindrical, tubular bobbin flange 18d extending axially into the nozzle housing 12 to reduce or dampen pressure oscillations resulting from electrical, mechanical, and/or hydraulic noise in the controlled fluid system or circuit, such as an automatic transmission circuit, as described in copending application Ser. No. 08/978,257, entitled "Proportional Variable Force Solenoid Control Valve With Armature Damping", of common assignee herewith, the teachings of which are incorporated herein by reference. The flange 18d includes fluid exhaust apertures 18e that register with exhaust ports EP in the nozzle housing 19.

In particular, there is a controlled clearance between the outer cylindrical peripheral surface 25 of the armature damping end disc 22a and the chamber wall 80a. The damping chamber 80 is molded or cast as part of the bobbin 18 and communicates via apertures 18e with the exhaust ports EP (two shown with two additional exhaust ports not shown extending into and out of the plane of the drawing). The cross-sectional area of the damping disc 22a and clearance between the surface 25 and the cooperating wall 80a are selected effective to reduce or damp pressure oscillations resulting from noise in the controlled circuit, which pressure oscillations can result in non-linear valve response performance. In effect, the damping chamber 80 and the armature damping end disc 22a provide a trapped volume of fluid comprising predominantly hydraulic fluid which must be moved through the restricted clearance area between the surface 25 and the wall 80a and in doing so reduces or damps pressure oscillations resulting from electrical, mechanical, and/or hydraulic noise on the controlled system or circuit.

The ball valve 38 is received and confined laterally in a flat-sided cage 17b of the valve seat insert 17 between the innermost armature end 22a and the valve seat 17a. The valve seat insert 17 is fluid tight sealed in the end 19a of nozzle housing 19 by O-ring seal 18c. In this valve arrangement, the ball valve 38 is biased against the innermost armature end 22a and follows movement of the armature 22 in a direction toward or away from the valve seat 17a by virtue of the fluid pressure on the ball valve and by virtue being captured in the recess 17b. The insert 17 can a molded or cast of metal or thermoplastic component.

The first end 19a of the nozzle housing 19 is joined to the solenoid can or housing 12 by crimping of tabs or shoulders 23 of the solenoid housing over radially extending flange 19c of the nozzle housing 19. The nozzle housing 19 includes O-ring seals 21a, 21b for sealing on the components of the mating fluid control system, such as on an automatic transmission valve body (not shown). The seals 21a, 21b sealingly separate a supply line or chamber SL from the control line or chamber CL as schematically illustrated in FIG. 1. The control line or chamber CL typically is communicated to a downstream component (not shown) external of the pressure regulating valve described hereabove to control operation thereof. The component can be a line pressure control valve of an automobile automatic transmission for purposes of illustration and not limitation. The supply line or chamber SL is communicated to a source of pressurized fluid, such as a hydraulic fluid pump (not shown).

The nozzle housing 19 preferably is molded, cast or otherwise formed from metal or plastic, such as thermoplastic, as a one-piece component to include a longitudinal passageway 66 having a cylindrical configuration and an integrally formed, fixed, axially extending tubular fluid flow directing sleeve 68 to simplify construction of the valve. The sleeve is supported in the passageway 66 by integrally molded or cast webs 68w of the nozzle housing 19 as best shown in FIG. 2. The material of the nozzle housing 19 can be selected in dependence upon the service conditions to be encountered. For example, glass filled Nylon 6/6 material can be used for low temperature and pressure service applications, while 6262 T8 aluminum material can be used for high temperature and pressure service applications. Spring loaded retention clips CS1, CS2 forming no part of the invention may be used to secure the nozzle housing 19 in a bore of a vehicle transmission housing.

The nozzle housing 19 is molded or cast to include supply port SP communicated to a first supply orifice O1 that is sized in diameter to initially adjust supply pressure entering the passageway 66. The supply port SP is connected to the supply line or chamber SL by a suitable fitting. The supply port SP can remain as-molded for noncritical regulating service applications and finish reamed, as needed, for more critical service applications.

The nozzle housing 19 has a second open end 19e remote from the first end 19a. A pair of arcuate control ports CP are defined on the second open end and communicate to the control line or conduit CL via a control port chamber C1. The control ports CP are defined by the molded or cast walls 19g of sleeve 68 and wall 19h of the nozzle housing.

The control ports CP are communicated to the primary orifice O2 by the longitudinal fluid passages 71 molded or cast as part of the nozzle housing 19 between the nozzle housing and the sleeve 68. Sealingly received in the second open end 19e is a conventional fluid filter F.

The fixed fluid flow directing internal sleeve 68 includes an outermost axial end 68a that receives an insert 69 having a secondary bleed orifice O3 and a longitudinal inner passageway 68b terminating at an innermost axial end in primary orifice O2 that is disposed opposite and proximate the valve seat insert 17 in a chamber C. The primary orifice O2 communicates to the valve seat 17a via axially extending fluid exhaust passage 17e in the insert 17. The primary orifice O2 is located axially spaced from the valve seat 17a through which pressurized fluid is exhausted to exhaust ports EP to regulate fluid pressure at control port CP. The exhaust ports EP are disposed on the nozzle housing 19 proximate the ball valve 38 as shown in FIG. 1 and communicate with an exhaust sump or return (not shown). Four circumferentially spaced exhaust ports EP can be used but the invention is not limited to this end as any number or such ports can be used. Laminar fluid flow is provided on ball valve 38.

It is apparent that the primary orifice O2 is communicated in fluid flow relation to the control ports CP by the one or more axially extending fluid passages 71 molded or cast as part of the nozzle housing 19 between the nozzle housing and the sleeve 68. The bleed orifice O3 is directly communicated to the control ports CP by being disposed in the same plane at the end of the sleeve 68. The control ports CP are communicated to the primary orifice O2 by the fluid passages 71.

Pressure regulation is achieved by movement of the armature 22 in response to electrical current to the coil 16 to exhaust pressurized fluid from chamber C. When no current is provided to the coil 16, the spring 42 biases the ball valve 38 to close on valve seat 17a ("off" state). The control ports CP receive the pressure present at valve seat 17a at this time via the fluid passages 71 between the nozzle housing 19 and the sleeve 68. When the coil 16 is energized by a maximum selected electrical current, the armature 22 is moved away from the valve seat 17a to the maximum extent ("on" state) to allow ball valve 38 to fully open and provide a zero or near zero fluid gage pressure at control ports CP. Movement of the armature 22 between these positions is effected by varying the current to the coil 16 to vary the ball valve position relative to valve seat 17a and thus exhaust more or less pressurized fluid from chamber C to port(s) EP as needed to regulate fluid pressure at control port CP in the desired manner.

Secondary bleed orifice O3 is provided in a position between the supply port SP and the control port CP remote from the valve seat 17a and proximate the control port CP to bleed pressurized fluid to the control port chamber C1 in a manner to provide more precise low pressure fluid control, for example, as the control port pressure approaches zero gage (control) pressure. This improved low pressure control is provided over a wide range of fluid pressures and temperatures and reduces negative pressures that can be generated proximate the valve seat 17a in chamber C when the valve is opened. In FIG. 1, the secondary bleed orifice O3 preferably is disposed directly axially opposite the control port chamber C1 to bleed fluid directly thereto. However, the position of the bleed orifice O3 can be varied to other axial locations of the sleeve 68.

The secondary bleed orifice O3 is sized in diameter to bleed pressurized fluid to the control port chamber C1 when the ball 38 valve is opened in response to movement of the armature 22 by energization of the coil 16. The fluid bled from orifice O3 can counteract any slightly negative pressure that can be generated by venturi effects in the chamber C when the valve 38 is opened as pressurized fluid is exhausted to the exhaust ports EP and provide a more precise low pressure control over wide operating fluid pressures and temperatures.

The ratio of the areas of the supply orifice O1, primary orifice O2, and secondary bleed orifice O3 is controlled to this end to minimize "off" (i.e. fluid pressure at control port chamber C1 approaching zero gage) pressure variations at the control port chamber C1 that result from such negative pressure in chamber C and variations in supply line pressure. For purposes of illustration and not limitation, the ratio of the cross-section areas of the cylindrical supply orifice O1, primary orifice O2, and secondary bleed orifice O3 can be controlled at 1.25:1.25:1.00 for operation under fluid supply pressures in the range of 40 to 250 psi where fluid exhaust passage 17e has an area of 0.0035 square inches and is axially positioned about 0.100 to 0.180 inches (distance D1) from the orifice O2, although the exhaust passage 17e is sized dependent on the required control pressure level.

Figure 5:
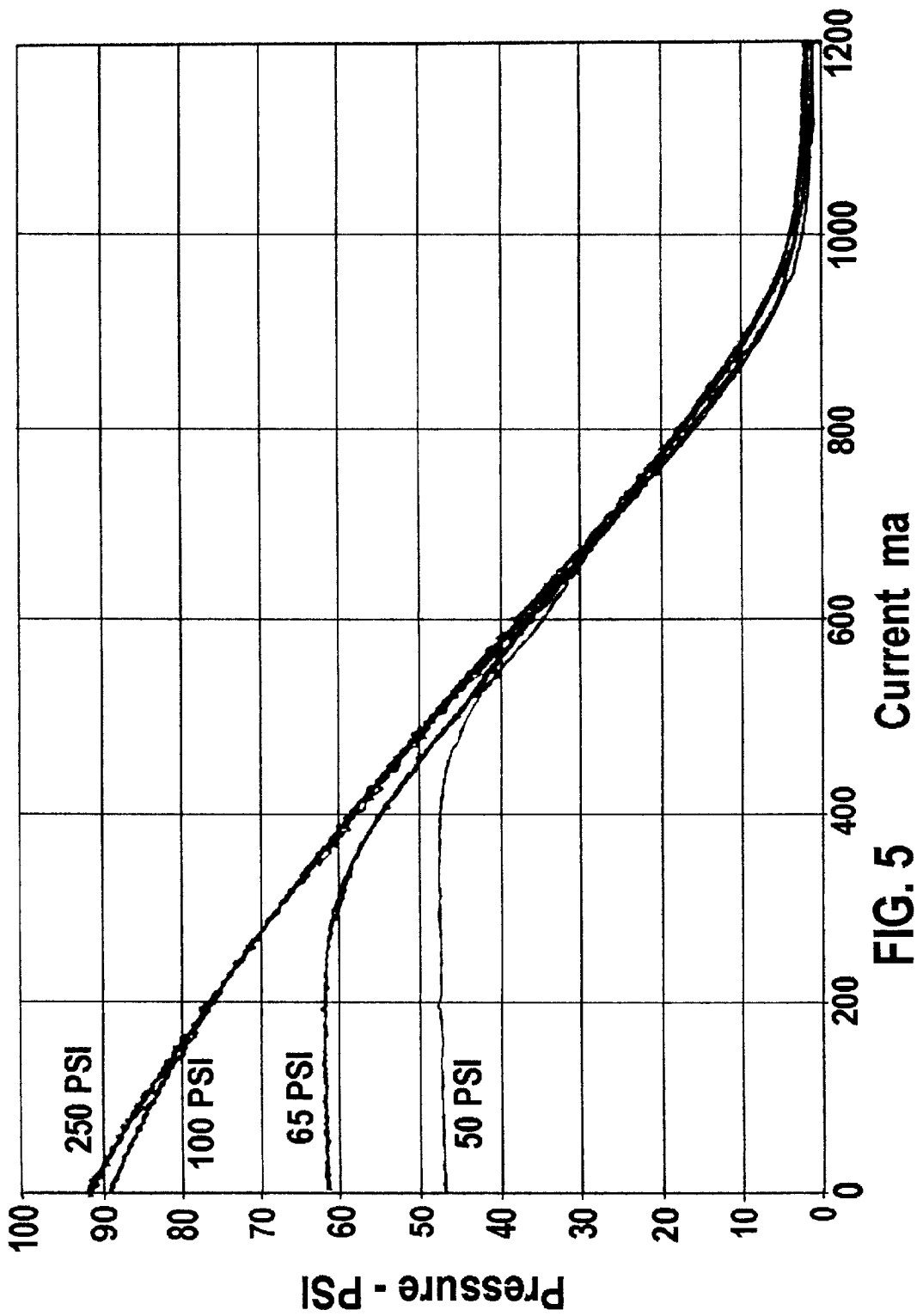
FIG. 5 is graph of control pressure versus electrical current to the solenoid coil for a single stage pressure regulating proportional variable force solenoid fluid valve in accordance with an embodiment of the invention.

FIG. 5 represents a graph of control pressure versus electrical current to the solenoid coil for a single stage pressure regulating proportional variable force solenoid fluid pressure regulating valve in accordance with the embodiment of the invention described hereabove. It is apparent that precise low pressure control at or near zero gage pressure at control port CP is provided at different supply line pressures of 50, 65, 100 and 250 psi.

Figure 4:
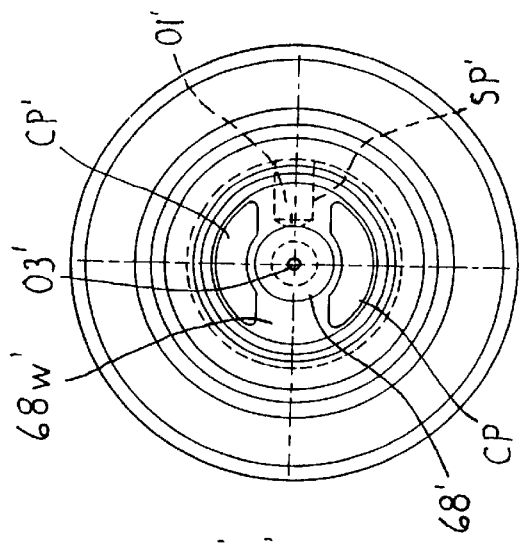
FIG. 4 is an end elevation of the valve of FIG. 3.
Figure 3:
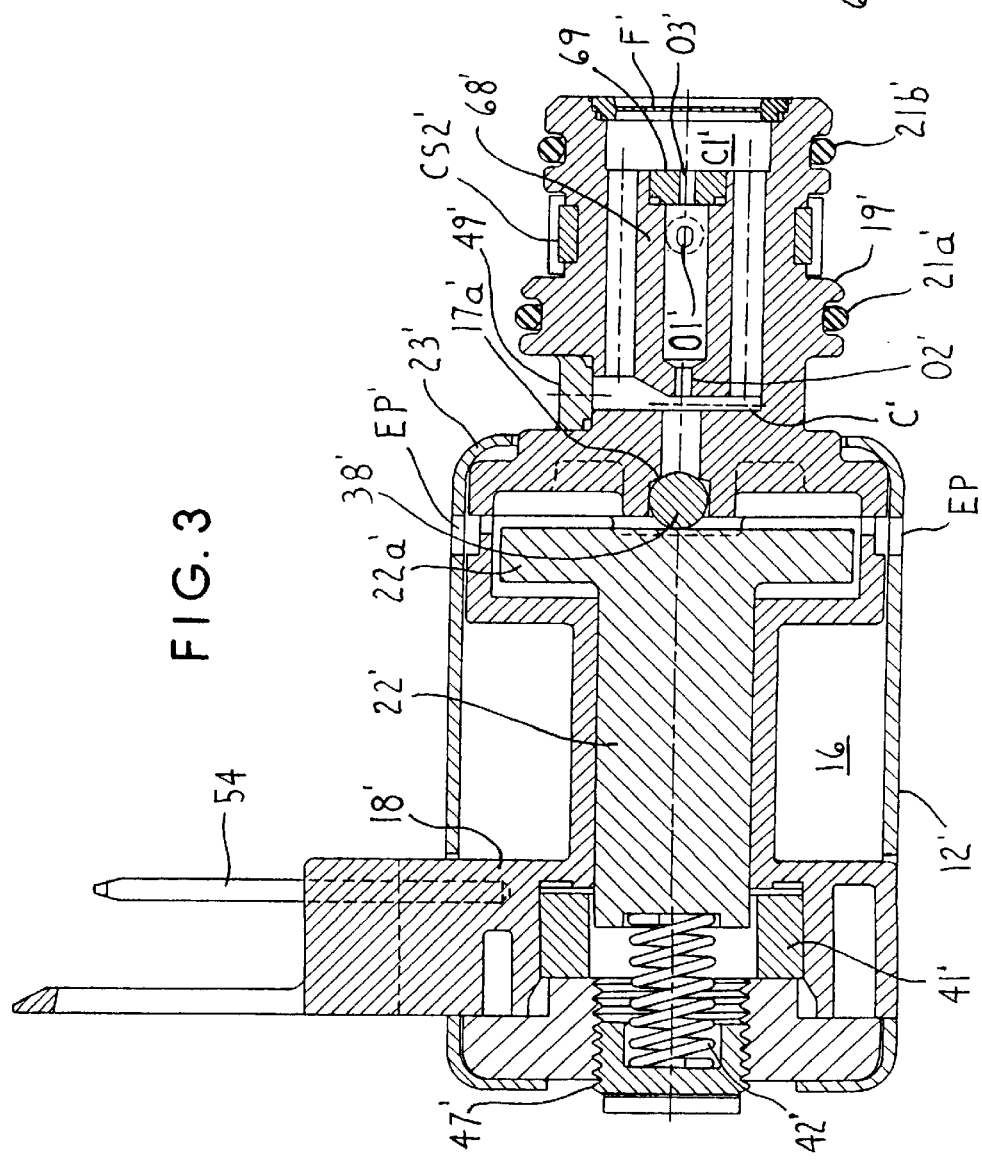
FIG. 3 is a longitudinal cross section view of a single stage pressure regulating proportional variable force solenoid fluid valve in accordance with another embodiment of the invention.

FIGS. 3–4 illustrate another embodiment of the invention where the nozzle housing 19' is integrally molded or cast to include the tubular fluid flow directing sleeve 68' and the valve seat 17a'. That is, the valve seat 17a' is molded or cast integrally with the nozzle housing 19' and internal sleeve 68', and is not a separate component as shown in FIG. 1, so as to further simplify construction of the valve. In FIGS. 3–4, like features of FIGS. 1–2 are represented by like reference numerals primed.

In addition, in FIGS. 3–4, an adjustment screw 47' is provided for adjusting the compression of spring 42' and thus valve response to solenoid current. A molded, ultrasonically welded slide plug 49' is shown in FIG. 3 sealing off the fluid passageway resulting from the molding process (e.g. cored passage). However, the fluid passageway may be heat staked closed for simplified construction. The ball valve 38' functions in the same manner as the ball valve 38 of the embodiment of FIGS. 1–2 to exhaust pressurized fluid from chamber C' via exhaust ports EP' in response to movement of the armature 22' as determined by the electrical current provided to the coil 16'. The secondary bleed orifice O3' at the outermost end of the internal sleeve 68' functions in a manner as described for secondary bleed orifice O3 of FIGS. 1–2 to bleed pressurized fluid to control port chamber C1' to minimize "off" pressure variations at the control port chamber C1' that result from such negative pressure in chamber C' and variations in supply line pressure.

Figure 6:
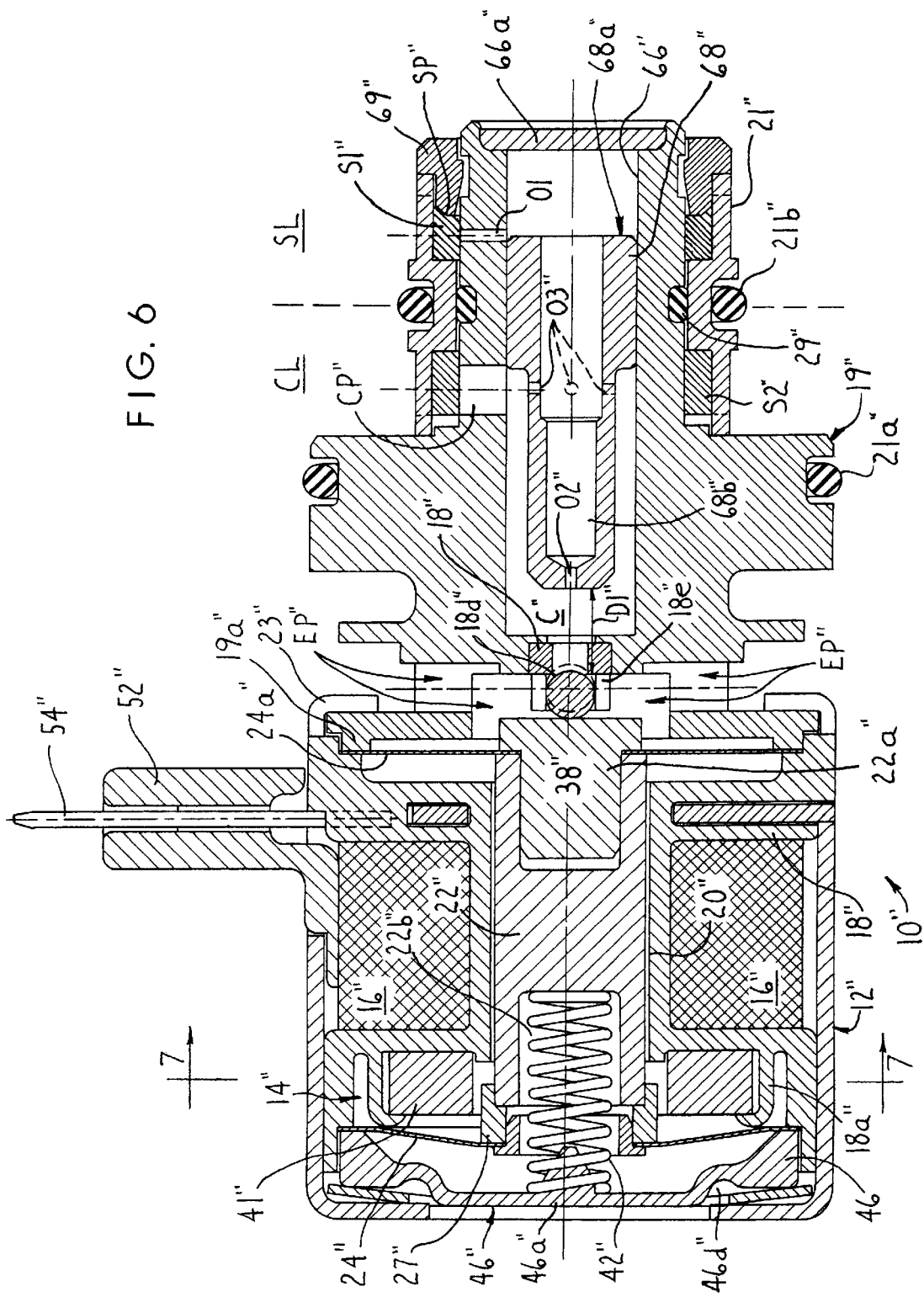
FIG. 6 is a longitudinal cross section view of a single stage pressure regulating proportional variable force solenoid fluid valve in accordance with still another embodiment of the invention.

FIG. 6 illustrates a proportional variable force solenoid control valve described and shown in copending parent application Ser. No. 08/770,635 hereof, now U.S. Pat. No. 5,845,667, the teachings of which are incorporated herein by reference. However, in FIG. 6, ball valve 38" is received in a flat-sided recess 18e" and engages a valve seat 18d" of a valve seat insert 18" formed integrally with the nozzle housing 19" by molding, casting, or other forming method rather than being a separate ball valve seat insert. Moreover, a fixed fluid flow directing internal sleeve 68" also is formed integrally with the nozzle housing 19" by molding, casting, or other forming method rather than being a separate ball valve seat insert. A one-piece nozzle housing 19" having the ball valve seat 18d" and sleeve 68" is thereby provided. The sleeve 68" includes a primary orifice O2" and bleed orifice O3" positioned proximate control port CP" that functions in the manner described above for the previously described embodiments of the invention. Supply port SP" provides pressurized fluid via orifice O1" to the sleeve 68" for flow through the primary orifice O2" and bleed orifice O3". Chamber C" is closed proximate supply port SP" by a closure cap 66a'.

The nozzle housing 19" includes a fluid filtering screen S1" for removing dirt or debris from fluid entering the nozzle section 19" via the supply port SP". The nozzle housing 19" also includes a fluid filtering screen S2" to this same end for control port CP". The filtering screens S1", S2" are held in position on the nozzle housing 19" by a tubular molded plastic filter support member 21" having windows exposing the screens S1", S2". O-ring seal 21b" resides on the support member 21", while the O-ring seal 23a" resides between nozzle housing 19" and support member 21". A filter retainer 69" made of plastic material is provided to lock the filter and support member in position.

The solenoid 14" includes components that are similar to those described above for solenoid 14 of FIG. 1 and are represented by like reference numerals double primed. For example, the solenoid 14" includes electromagnetic coil 16" wound about molded plastic bobbin 18" with a rod-like armature 22" received in the bore hole 20" of the bobbin 18". The armature 22" includes an innermost end supported on plate spring 24a" and receiving a plug 22a" that engages the ball valve 38" cooperating with the valve seat 18d" for diverting or exhausting fluid to one or more exhaust ports EP" in described above.

The secondary bleed orifice O3" is provided in a position between the supply port SP" and the control port CP" to bleed pressurized fluid to the control port CP" in a manner to provide more precise low pressure fluid control, for example, as the control port pressure approaches zero gage pressure. This improved low pressure control is provided over a wide range of fluid pressures and temperatures and reduces the negative pressures that can be generated proximate the valve seat 18d" in chamber C" when the valve is opened as shown in FIG. 3 of parent application Ser. No. 08/770,635, now U.S. Pat. No. 5,845,667.

Figure 7:
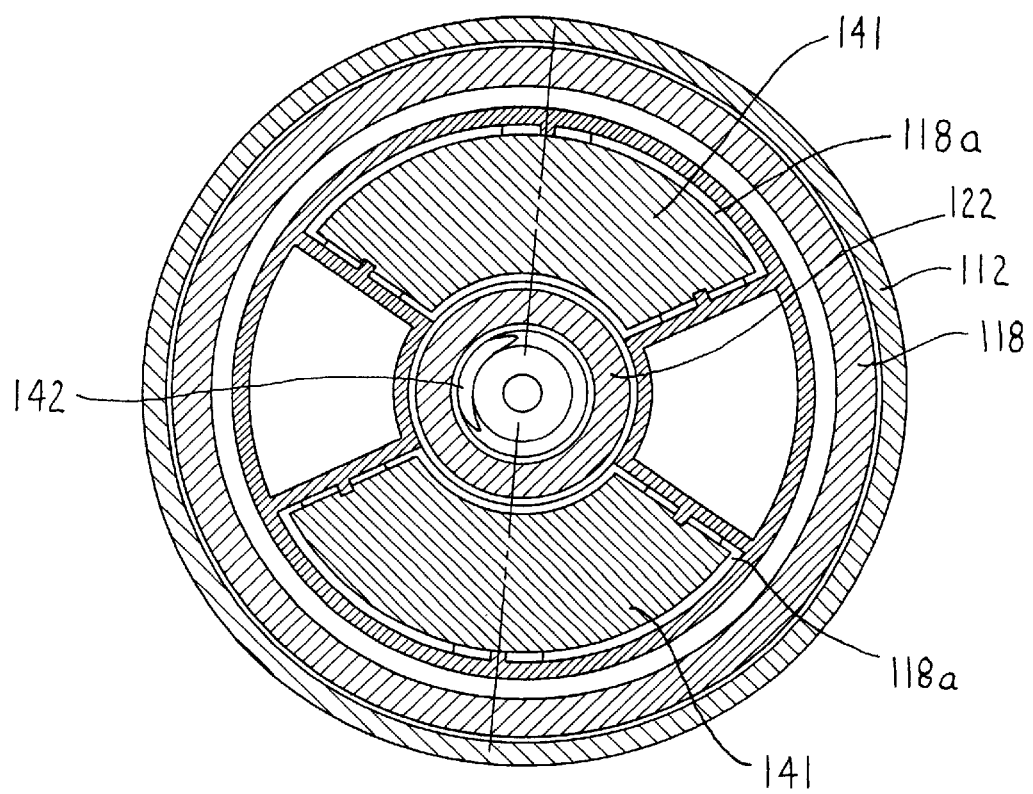
FIG. 7 is a sectional view of another embodiment of the invention considered as taken along lines 7-7 of FIG. 6 where permanent ring magnet is replaced by a pair of arcuate segmented permanent magnets.

In lieu of a ring magnet 41 (41', 41") in the above embodiments, a pair (or other number) of arcuate segmented permanent magnets 141, FIG. 7, alternately may be used in practicing the invention as described in copending application Ser. No. 09/063,963 entitled "Proportional Variable Force Solenoid Control Valve With Segmented Permanent Magnets", of common assignee herewith, the teachings of which are incorporated herein by reference. The arcuate segmented permanent magnets 141 are received in pockets 118a molded as part of the bobbin 118. FIG. 7 can be considered as taken along line 7—7 of FIG. 6 where ring magnet 41" is replaced by the pair of arcuate segmented permanent magnets 141 with spring 142 residing in the axial end of the armature 122 and the bobbin being received in housing 112.

Although certain preferred embodiments of the pressure regulating solenoid valve of the invention have been shown and described in detail, it should be understood that variations or modifications may be made without departing from the spirit or scope of the present invention.

We claim:

1. A solenoid actuated valve for regulating the pressure of a pressurized fluid in a fluid control system in proportion to the current level of an electrical input signal, comprising a nozzle housing having a fixed fluid flow directing tubular sleeve internal thereof and communicated to a supply port for receiving pressurized fluid therefrom, said sleeve including a primary orifice that communicates to a valve seat and to a control port via at least one fluid passage between said nozzle housing and said sleeve and including a secondary bleed orifice thereon located proximate said control port, said control port communicating with an external fluid pressure actuated component, a variable force solenoid actuated valve that cooperates with said valve seat receiving pressurized fluid from the primary orifice to control flow of pressurized fluid to at least one exhaust port as a means to regulate pressure at the control port in dependence upon electrical current to a coil of the solenoid actuated valve, said secondary bleed orifice being disposed on said sleeve proximate said control port to bleed pressurized fluid to said control port in a manner to provide more precise low pressure fluid control.

2. The valve of claim 1 wherein said nozzle housing has a first end connected to a solenoid housing and an opposite second end, said control port being disposed proximate said second end and communicated to said primary orifice by said at least one fluid passage.

3. The valve of claim 1 wherein said fixed sleeve includes said primary orifice proximate said first end of said nozzle housing and said secondary bleed orifice located proximate said second end thereof.

4. The valve of claim 1 wherein said fixed sleeve is disposed axially in a longitudinal passage of said nozzle housing and said supply port extends transverse to said longitudinal passage to communicate to said sleeve.

5. The valve of claim 1 wherein the bleed orifice is effective to substantially eliminate negative pressure at said control port when gage fluid pressure at said control port approaches zero.

6. The valve of claim 5 wherein said valve seat is formed integrally with said nozzle housing and said fixed sleeve.

7. The valve of claim 1 wherein said nozzle housing and said fixed sleeve are formed integrally to one another as one piece.

8. A solenoid actuated valve for regulating the pressure of a pressurized fluid in a fluid control system in proportion to the current level of an electrical input signal, comprising a solenoid housing, a nozzle housing having first end connected to said solenoid housing and an opposite second end, said nozzle housing including a fixed fluid flow directing tubular sleeve internal thereof and communicated to a supply port for receiving pressurized fluid therefrom, said sleeve including a primary orifice that communicates to a valve seat proximate said first end and to a control port at said second end via at least one fluid passage between said nozzle housing and said sleeve and further including a secondary bleed orifice thereon located proximate said control port, and a variable force solenoid actuated valve that cooperates with said valve seat receiving pressurized fluid from the primary orifice to control flow of pressurized fluid to at least one exhaust port as a means to regulate pressure at the control port in dependence upon electrical current to a coil of the solenoid actuated valve, said secondary bleed orifice being disposed on said sleeve proximate said control port to bleed pressurized fluid directly to said control port in a manner to provide more precise low pressure fluid control.

9. The valve of claim 8 wherein said nozzle housing and said sleeve are formed integrally to one another as one piece.

10. The valve of claim 9 wherein said valve seat is formed integrally with said nozzle housing and said sleeve.

11. A solenoid actuated valve for regulating the pressure of a pressurized fluid in a fluid control system in proportion to the current level of an electrical input signal, comprising a solenoid housing, a nozzle housing connected to said solenoid housing and having a fluid flow directing tubular internal sleeve formed integrally therein, said sleeve being communicated to a supply port for receiving pressurized fluid therefrom, said sleeve including a primary orifice that communicates to a valve seat and to a control port via at least one passage between said nozzle housing and said sleeve, and a solenoid actuated valve that cooperates with said valve seat receiving pressurized fluid from the primary orifice to control flow of pressurized fluid to at least one exhaust port as a means to regulate pressure at the control port in dependence upon electrical current to a coil of the solenoid actuated valve.

12. The valve of claim 10 wherein said valve seat is formed integrally with said nozzle housing and said internal sleeve.

13. The valve of claim 10 wherein said sleeve includes a secondary bleed orifice to bleed pressurized fluid to said control port in a manner to provide more precise low pressure fluid control.

14. The valve of claim 10 wherein said solenoid housing comprises a non-magnetically permeable housing.

* * * * *